(12) United States Patent
Reineccius et al.

(10) Patent No.: US 11,865,940 B2
(45) Date of Patent: Jan. 9, 2024

(54) LOAD ADAPTIVE ELECTRIC VEHICLE SUPPLY EQUIPMENT FOR REDUCTION OF INSTALLATION UPGRADE REQUIREMENTS

(71) Applicant: POWERTREE SERVICES, INC., San Francisco, CA (US)

(72) Inventors: Stacey Reineccius, San Francisco, CA (US); John C. Sellers, El Cerrito, CA (US)

(73) Assignee: POWERTREE SERVICES, INC., San Francisco, CA (US)

(*) Notice: Subject to any disclaimer, the term of this patent is extended or adjusted under 35 U.S.C. 154(b) by 482 days.

(21) Appl. No.: 17/120,621

(22) Filed: Dec. 14, 2020

(65) Prior Publication Data

US 2022/0185136 A1  Jun. 16, 2022

(51) Int. Cl.
*B60L 53/62* (2019.01)
*B60L 53/63* (2019.01)
*H02J 7/00* (2006.01)
*B60L 53/66* (2019.01)
*B60L 53/16* (2019.01)

(52) U.S. Cl.
CPC ............... *B60L 53/62* (2019.02); *B60L 53/63* (2019.02); *B60L 53/665* (2019.02); *H02J 7/00* (2013.01); *B60L 53/16* (2019.02); *B60L 2250/16* (2013.01)

(58) Field of Classification Search
CPC .......... B60L 53/16; B60L 53/62; B60L 53/63; B60L 53/665; H02J 7/00; Y02T 90/12
See application file for complete search history.

(56) References Cited

U.S. PATENT DOCUMENTS

| | | | |
|---|---|---|---|
| 8,232,765 B2 | 7/2012 | Billmaier | |
| 9,878,629 B2 | 1/2018 | Lowenthal et al. | |
| 10,693,294 B2 | 6/2020 | Kearns et al. | |
| 2011/0133693 A1* | 6/2011 | Lowenthal | B60L 53/34 320/109 |
| 2012/0032636 A1* | 2/2012 | Bianco | B60L 53/63 320/109 |
| 2013/0141040 A1* | 6/2013 | DeBoer | B60L 53/62 320/109 |

(Continued)

FOREIGN PATENT DOCUMENTS

TW  I443505 B  7/2014

*Primary Examiner* — Richard Isla
*Assistant Examiner* — Johali A Torres Ruiz
(74) *Attorney, Agent, or Firm* — Geoffrey Lottenberg; Berger Singerman LLP

(57) ABSTRACT

An adaptive electric vehicle supply equipment (EVSE) unit provides intelligent control to vary the EVSE load placed upon the local electric connection based upon real time load measurements of both the overall premises load and the specific capacities and requirements of the EVSE. The EVSE unit includes a current power transformer at the main service entry point to capture real time power level at the meter. Additional real time current measurements are available within unit to measure the real time output power on the AC legs going to a vehicle. The unit is configured to a controller module which measure and controls the pilot signal output based on a comparison of the power level at the meter with the power level at the EVSE unit against the desired or required power output to the vehicle.

19 Claims, 4 Drawing Sheets

(56) References Cited

U.S. PATENT DOCUMENTS

| | | | |
|---|---|---|---|
| 2014/0077762 A1* | 3/2014 | Spanos | B60L 53/305 |
| | | | 320/109 |
| 2015/0352971 A1* | 12/2015 | Bianco | B60L 53/665 |
| | | | 307/9.1 |
| 2015/0367742 A1 | 12/2015 | Soden et al. | |
| 2016/0075246 A1* | 3/2016 | Liptak | B60L 58/10 |
| | | | 320/109 |
| 2016/0137087 A1* | 5/2016 | Haas | B60L 53/66 |
| | | | 320/109 |
| 2018/0043786 A1* | 2/2018 | Corbeil | B60L 53/30 |
| 2019/0061546 A1* | 2/2019 | Miftakhov | H02J 3/322 |
| 2019/0389315 A1* | 12/2019 | Zhu | B60L 53/64 |

\* cited by examiner

LOAD ADAPTIVE ELECTRIC VEHICLE SUPPLY EQUIPMENT FOR REDUCTION OF INSTALLATION UPGRADE REQUIREMENTS

CROSS-REFERENCE TO RELATED APPLICATIONS

N/A

BACKGROUND OF THE INVENTION

Current electricity installations for residences or commercial locations are measured for their power consumption using standardized meters (watt-hour meters) which are inserted in standardized meter sockets. These meters feed electric distribution panels to which various electric loads either single-phase, dual-phase or three-phase are connected.

Electric installations are sized at time of construction for a maximum load size with a typical assumption that the service is sized with every device activated simultaneously.

Typical electrical installations do not account for local electric vehicle supply equipment (EVSE). If a local EVSE is desired, is it typically installed as an add-on by connecting the equipment is to the main panel box via a new conduit to the panel box. This new conduit may be provided from the EVSE AC Input at the installation location to a new breaker on the distribution panel. The new breaker must be sized according to the capacity of the panel box rating and the other loads present at the location or premise.

This current practice has numerous flaws which results in longer than needed labor times and greater complexity and costs of installation. For example, systems often may require a service upgrade on the main service as the EVSE can easily draw 50 Amperes or more. A service upgrade can take months and have very substantial costs or may simply not be available at all due to local regulation or other factors. In addition, there is often additional labor in surveying and engineering the installation and sometimes a need to reduce the size of the EVSE systems because of inadequate current capacity in existing panel boxes. This results in longer charging duration for EVs due to insufficient or inadequate current output. Further, extra labor and design time is required up front to analyze and minimize costs and old systems often must be completely replaced due to the inability to locate available spare or otherwise compatible parts. Therefore, there exists a need for a simpler and faster interconnect means that allows for lower cost installation to more locations with less pre-planning and shorter lead times to accomplish the interconnect that can handle potentially more locally delivered energy to the EVSE without creating undue inconvenience to the EVSE user or create safety hazards through overloading.

SUMMARY OF THE INVENTION

The invention disclosed herein, described as a Local Adaptive EVSE, provides the intelligent control of an EVSE unit to vary the EVSE load placed upon the local electric connection based upon real-time current load measurements of both the overall premises load and the specific capacities and requirements of the EVSE. While typically a SAE J1772 compliant EVSE is contemplated here, this same approach may be applied to other charger formats. Various aspects of the invention described herein may be applied to any of the applications set forth below. The invention may be applied as a standalone system or as a component of an integrated solution. It shall be understood that different aspects of the invention can be appreciated individually, collectively or in combination with each other.

One aspect of the invention provides a system for interconnecting a current power transformer (CT) at the main service entry point for the meter being served so as to capture the real time power level of the meter. These CTs typically clip on requiring no physical cutting, splicing, or rewiring and are connected to an analog measurement point of a controller module of the Load Adaptive EVSE of the present invention. Additional real time current measurements are available within the Load Adaptive EVSE to measure the real time output power on the AC legs going to a vehicle.

The Load Adaptive EVSE is configured with parameters corresponding to the size of the main service and the size of its breaker connection. Other parameters for other functions may also be configured. In operation, the Load Adaptive EVSE will measure simultaneously the current level of the load being delivered to a vehicle connected to the EVSE and the current level of the premise's connection. These measurements are compared and if the premises current level reaches the a predetermined limit, and there is load on the EVSE, then the Load Adaptive EVSE reduces the load of the EVSE by adjusting the pilot signal (in J1772 systems or the equivalent in other standards) so as to keep the total power being drawn at or under the limit of the full premise. If the load at the premises drops and the EVSE level can be increased to charge the vehicle faster, then the Load Adaptive EVSE may also increase the load allowed to the vehicle via the pilot signal.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings, given below, explain the principles of the disclosure.

Figure 1:
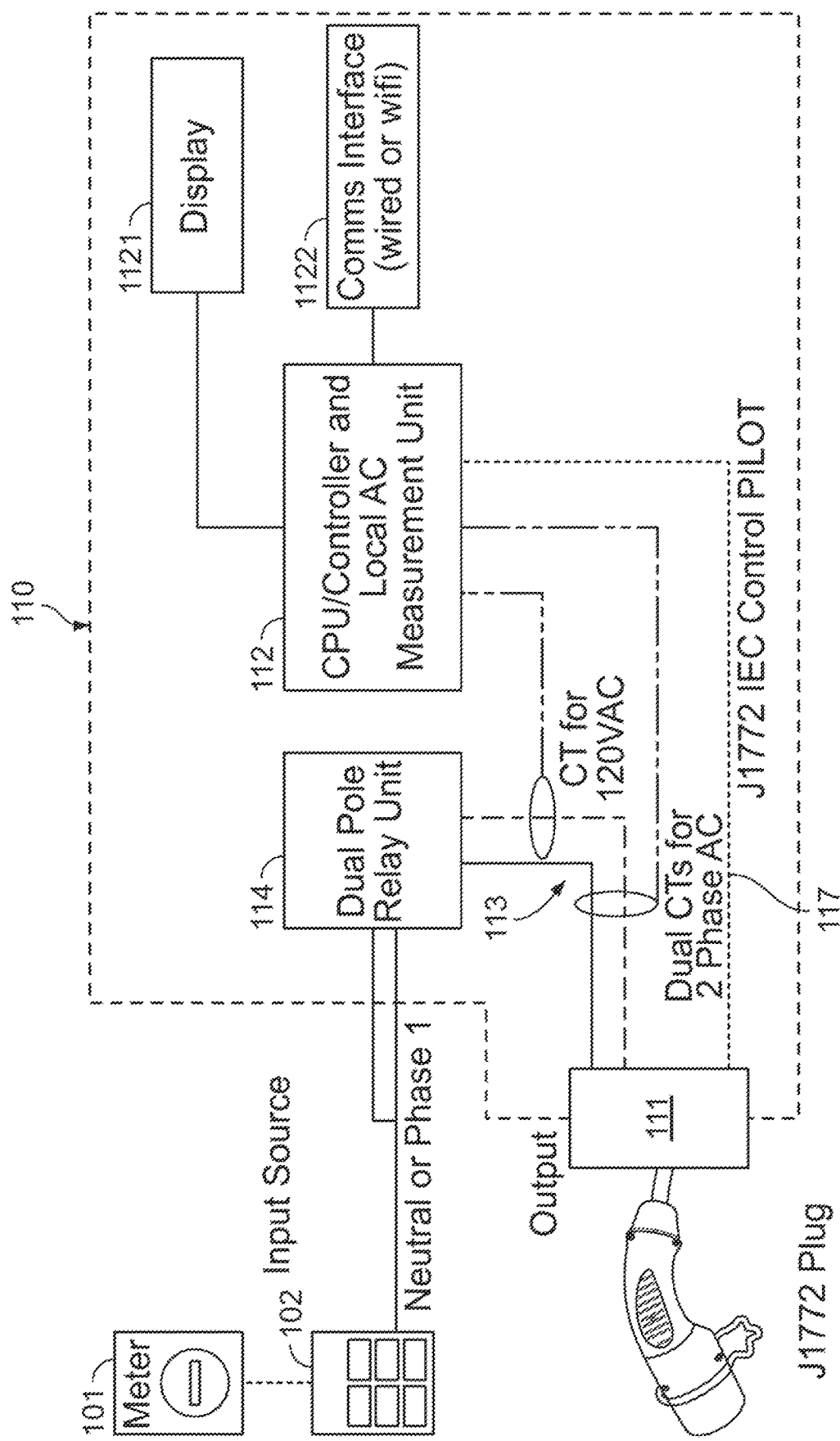
FIG. 1 illustrates the elements of a common industry EVSE unit compliant with the SAE J1772 EVSE standard.

The drawings are not necessarily to scale. In certain instances, details that are not necessary for an understanding of the disclosure or that render other details difficult to perceive may have been omitted. It should be understood, of course, that the disclosure is not necessarily limited to the embodiments illustrated herein.

DETAILED DESCRIPTION OF THE INVENTION

The present invention provides its benefits across a broad spectrum of endeavors. It is applicant's intent that this specification and the claims appended hereto be accorded a breadth in keeping with the scope and spirit of the invention being disclosed despite what might appear to be limiting language imposed by the requirements of referring to the specific examples disclosed. Thus, to acquaint persons skilled in the pertinent arts most closely related to the present invention, a preferred embodiment of the system is disclosed for the purpose of illustrating the nature of the invention. The embodiments described herein are illustrative, and as will become apparent to those skilled in the art, can be modified in numerous ways within the scope and spirit of the invention, the invention being measured by the appended claims and not by the details of the specification.

Although the following text sets forth a detailed description of numerous different embodiments, the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent application, which would still fall within the scope of the claims.

It should also be understood that, unless a term is expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, subparagraph (f).

Embodiments of the present invention relate to the process of interconnecting a Load Adaptive or Load Smart EVSE unit to a local utility power grid. Embodiments of the present invention may lower the cost of interconnection and speed up the process of installation for local EV Charging systems such as those used in consumer or commercial applications. Further, the automatic adjustment to accommodate other loads increases the convenience and lowers potential conflicts in operations leading to more utilization, faster charging times, and increased efficiency.

Referring to FIG. 1, shown is the current state of the art in a standard compliant EVSE unit installation as it would be configured and typically installed. This is a baseline design and incorporates the various communications, electrical and operating protocols defined by said Standards. The installation includes a common electric utility meter 101 connected to an electrical distribution panel 102. These components are available from various manufacturers and are required to be safety certified by and appropriate safety testing lab. The meter 101 and panel 102 provide a location for the attachment of current measurement transformers or interfaces that can measure the full combined load being served through the panel as further described herein. Typically, the panel 102 has a main breaker that protects the connection to the meter 101 and reflects the maximum possible current servable from the meter.

The distribution panel 102 is connected to the EVSE unit 110, which in this embodiment is configured per the SAE J1772 standard. The EVSE unit 110 includes an output 111, which may comprise a plug and cable assembly, such as a J1772 plug, which connects to the input of standard compliant electric vehicles. Controller module 112, which includes a microprocessor and embedded firmware, measures, interfaces, and relays output controls to operate the EVSE. In some embodiments, the controller module 112 includes and/or is connected to a display 1121 and a communications interface 1122, such as a wired or wireless communications device (RS485, Serial, Bluetooth, Wifi, Ethernet or other such communications interface standards). In some embodiments, one or more EVSE current transformers 113 are provided, for both single phase and dual phase current measurement incorporated within the standard EVSE. Also included is a relay unit 114 which is in communication with the controller module 112 to enable connection or disconnection, i.e. switching, of power to the output 111.

Figure 2:
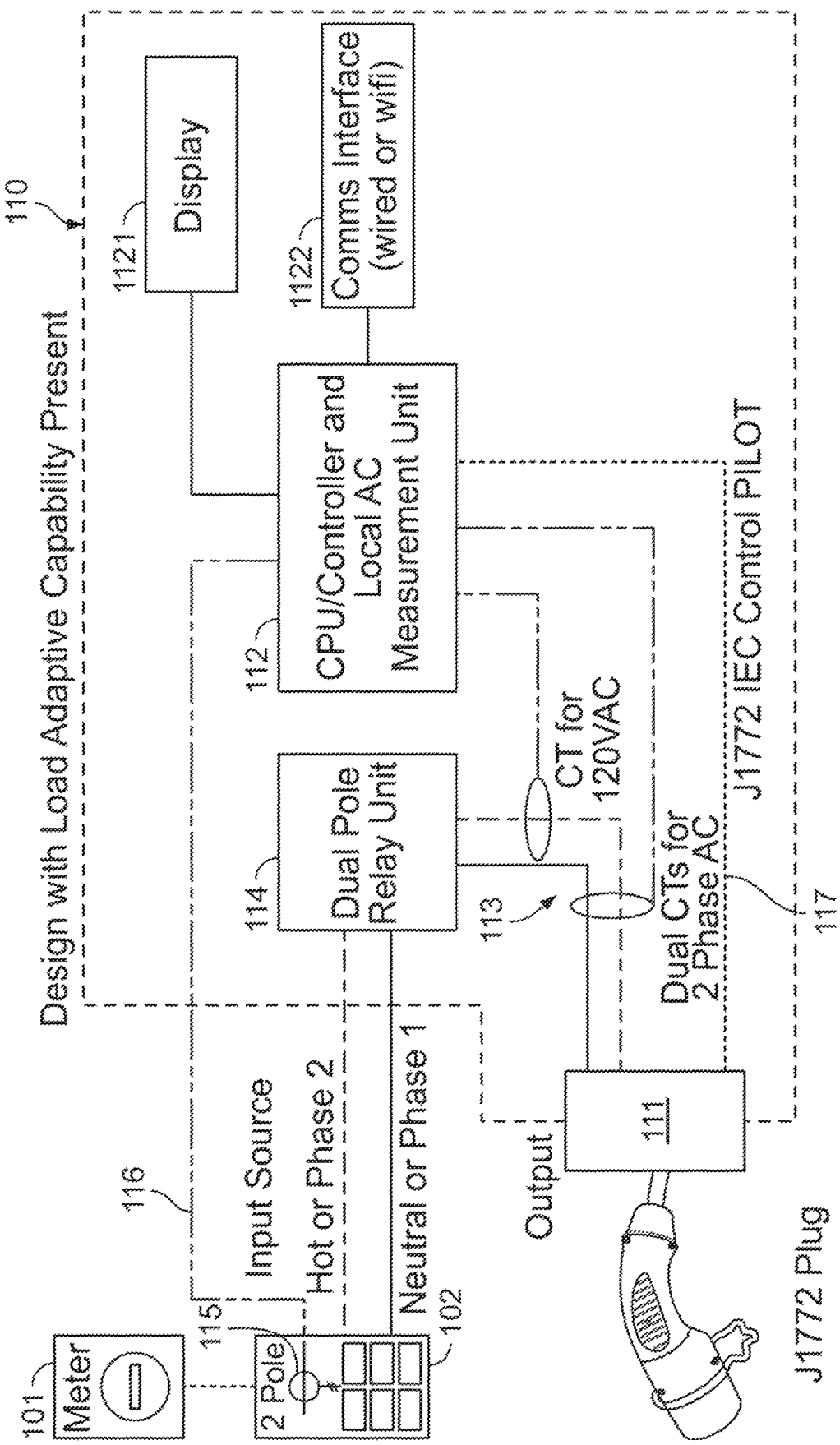
FIG. 2 illustrates the configuration shown in FIG. 1 in use with the invention described herein.

FIG. 2 illustrates a preferred implementation of the present invention wherein certain additional capabilities are added to the configuration shown in FIG. 1. Here, an additional measurement point is attached at either the meter 101 or panel 102 via the addition of a panel current transformer 115 which measures the full current load at the premises. In some embodiments, the current transformer 115 comprises a 2-pole current transformer placed so as to measure the full premises current at the panel 102, with an additional signal 116 back to a modified controller module 112. The controller module 112 includes additional measurement interfaces and contains modified software code to manage the measurement and control of the J1772 IEC pilot signal 117. In some embodiments, the current transformer 115 is attached via a wired or wireless communications interface to controller module 112 to carry signal 116.

As noted, controller module 112 has additional measurement connection to the current transformer 115 and the embedded firmware has been modified to implement the output current limiting logic of the present invention. The logic of the controller module 112 is configured to compare measurements at the panel current transformer 115, which is the whole premises current, with measurements at the EVSE current transformers 113 against a predetermined maximum allowable current of the main panel 102. For example, the controller module 112 is configured to conditionally adjust the pilot output signal 117 such that if the current at the panel current transformer 115 is at 95% or more of the predetermined maximum allowable current, then the pilot output signal 117 is reduced, which reduces the amount of current sent to the vehicle at the output 111. In another example, if the current at the panel current transformer 115 is under the 95% threshold and the measurement at the EVSE current transformer 113 is below the maximum setting at the output 111 (i.e. the maximum current the vehicle can accept or otherwise a predetermined output), then the pilot signal 117 is adjusted upward to the maximum setting at the output 111. This feedback and comparison process repeats indefinitely until a charging session is ended and starts again when a new charging session is begun. In some embodiments, an initial measurement is set at the start of a charging session based on the continuous ongoing measurements of whole premises load versus the predetermined maximum so that upon startup the allowable load does not exceed the maximum. Further, it is appreciated and understood that the threshold percentages described above can vary depending on the application and desired factors of safety of the system. In this way, it is seen how the Load Adaptive EVSE unit 110 is configured to react the load conditions at the premises to either increase or decrease the current available to the electric vehicle at the output 111 based on the current requirements of other devices at the premises.

Figure 3:
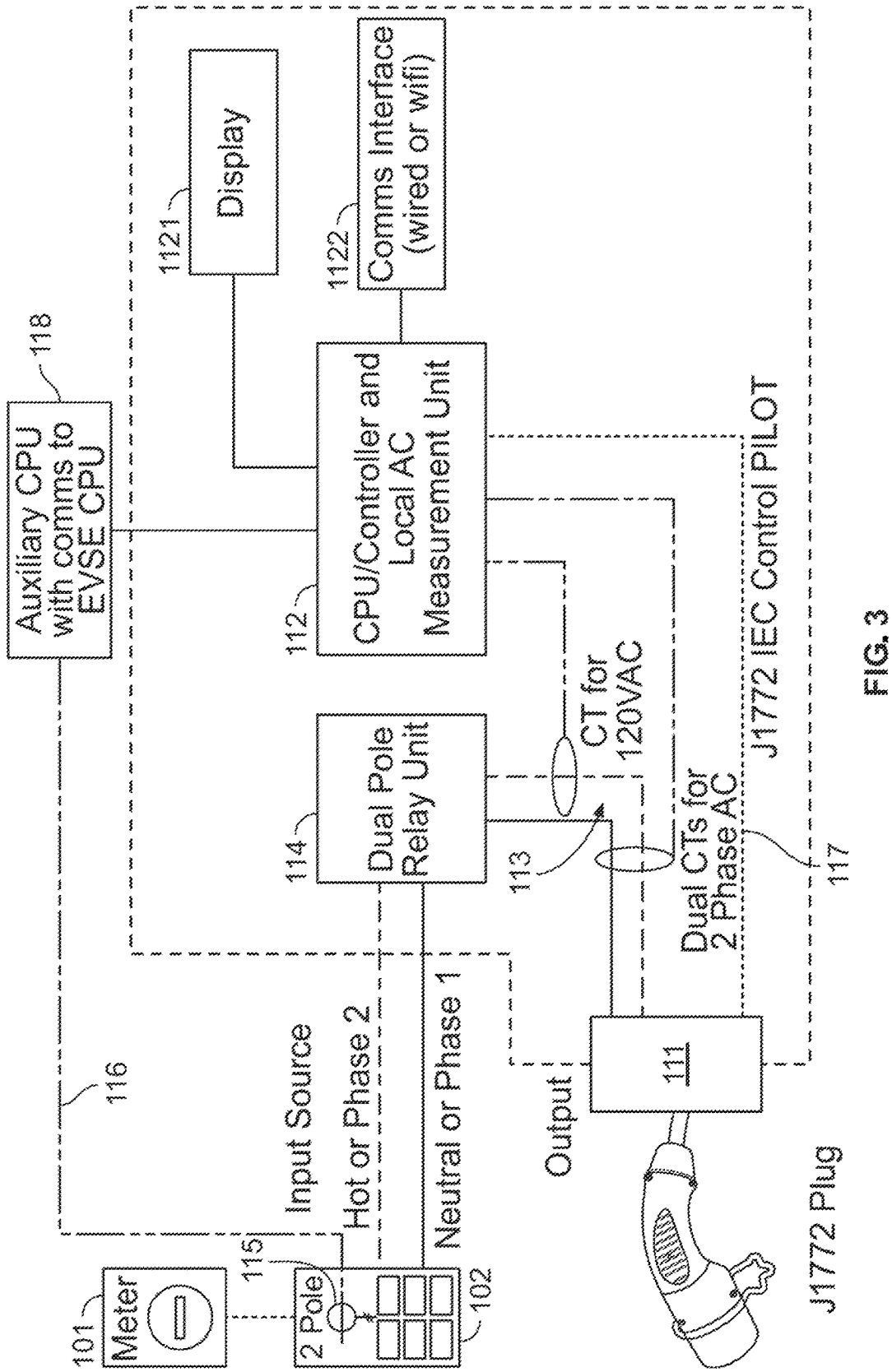
FIG. 3 shows an alternate implementation for the invention described here, via an auxiliary controller containing the current transformer measurement interfaces and a communications link to the primary EVSE.

FIG. 3 shows an alternate configuration to achieve the same results of the configuration shown and described in FIG. 2 but enables a retrofit of an existing EVSE system if the existing EVSE has a remote-control application program interface (API). Here, added to the system is an auxiliary controller 118 which is placed in bi-directional data communication with the controller module 112 and through which the signal 116 from the panel current transformer 115 passes through. Here, the auxiliary controller monitors measurements from the panel current transformer 115 and conducts bidirectional communications (via RS485, Serial, Bluetooth, Wifi, Ethernet or other such communications interface standards) with the controller module 112 via an API enabling the auxiliary controller 118 to issue appropriate control commands to the controller module 112, which can then adjust the pilot signal 117. Accordingly, in this embodiment the auxiliary controller 118 replaces the need to modify the controller module 112 as in the embodiment shown in FIG. 2 such that the auxiliary controller 118 performs the current and load measurements at the panel current transformer 115 and implements adjustment logic of the pilot signal 117 by communication to the controller module 112 via an API.

Figure 4:
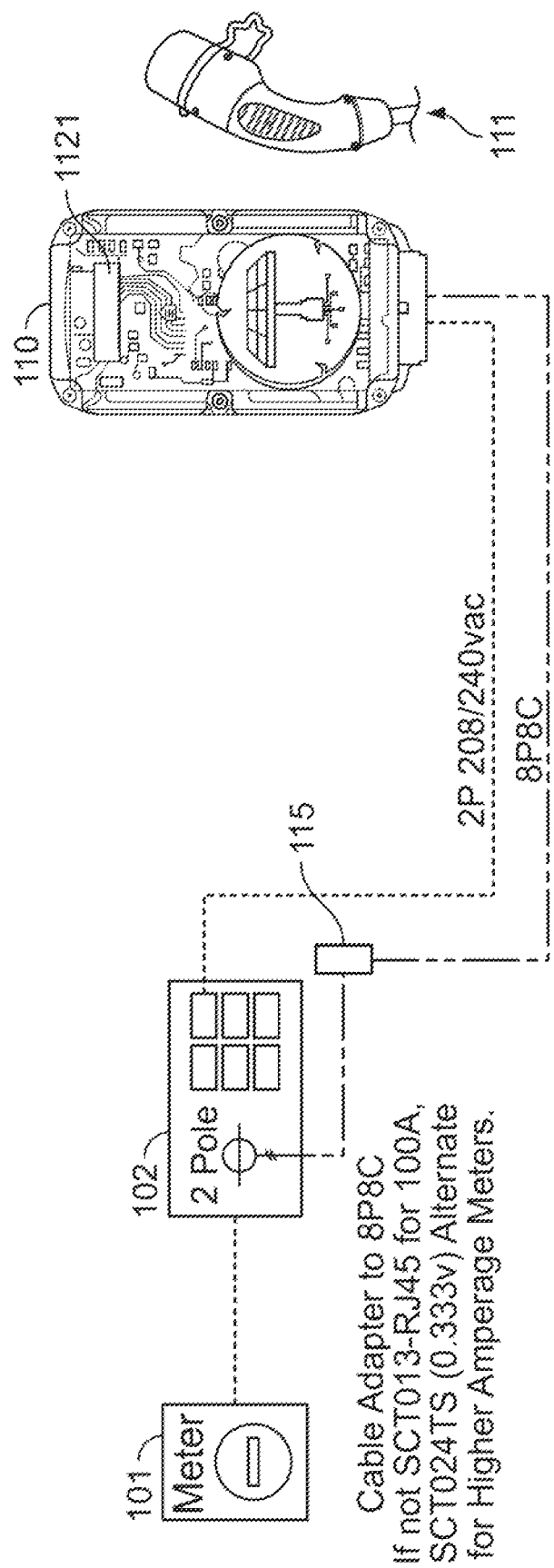
FIG. 4 is an example embodiment of the EVSE unit in a housing and connected to a panel.

With reference to FIG. 4, in some embodiments, the EVSE of the present invention utilizes Open EVSE Plus as a base platform and the housing of the unit is a NEMA 3R compliant, or better. The system adds a premises current measurement feature by way of a clamp-on to the main service lines, which allows for monitoring of the actual load. The user can pre-set the maximum panel rating (MAXHOUSE), i.e. the predetermined maximum based on the panel configuration. The actual current reading (ACTUALHOUSE), which is the highest reading of the two legs of the premises, is detected and can be shown on the display 1121 of the EVSE unit 110. In some embodiments, the current transformer 115 comprises two separate units configured at plug in current transformers SCT013-RJ45 or SCT013 (50 A) with a CT concentrator and 8p8C cable plugged into a port on the housing. In the case of services with greater than 100 A, an adapter and a larger current transformer can be implemented. With the maximum capacity of the breaker at the panel denoted at MAXEVSE, during operation the EVSE Unit 110 dynamically adjusts the allowed rate of charge (ACTUALEVSE) by adjusting the pilot signal 117 to the electric vehicle in accordance with the following formula: ACTUALEVSE=MIN ((MAXHOUSE-ACTUALHOUSE), MAXEVSE). This enables simultaneous operation of the EVSE and the household devices by prioritizing the household over the EVSE unit 100.

It is appreciated and understood that all concepts of the invention described herein may incorporate or integrate concepts utilized by other types of watt-hour meter adapters and inserts including but not limited to those described by Applicant in the following which are hereby incorporated by reference in its entirety: U.S. Patent No. US20150367742A, U.S. patent Ser. No. 10/639,324, Taiwan Patent No. TWI443505B, and U.S. Pat. No. 9,878,629. The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the present disclosure has included description of one or more embodiments and certain variations and modifications, other variations and modifications are within the scope of the disclosure, e.g., the use of a certain component described above alone or in conjunction with other components may comprise a system, while in other aspects the system may be the combination of all of the components described herein, and in different order than that employed for the purpose of communicating the novel aspects of the present disclosure. Other variations and modifications may be within the skill and knowledge of those in the art, after understanding the present disclosure. This method of disclosure is intended to obtain rights which include alternative embodiments to the extent permitted, including alternate, interchangeable and/or equivalent structures, functions, ranges or steps to those claimed, whether such alternate, interchangeable and/or equivalent structures, functions, ranges or steps are disclosed herein, and without intending to publicly dedicate any patentable subject matter.

What is claimed is:

1. A load adaptive electric vehicle supply equipment (EVSE) system, comprising:
    an EVSE unit comprising a controller module, an EVSE current transformer, and an output, wherein the EVSE current transformer is connected between the controller module and the output and wherein the controller module transmits a pilot output signal to the output;
    an electric service panel including a panel current transformer, wherein the panel current transformer is connected between the electric service panel and the controller module; and
    wherein the controller module is configured to compare current load measurements at the panel current transformer with current load measurements at the EVSE current transformers against a predetermined maximum allowable current of the electric service panel and adjust the pilot output signal to adjust the current at the output, and
    wherein the controller module is configured to reduce the pilot output signal to the output if the current load at the panel current transformer is equal to or greater than 95% of the predetermined maximum allowable current of the electric service panel.

2. The load adaptive electric vehicle supply equipment (EVSE) system of claim 1, wherein the controller module includes a display and a communications interface.

3. The load adaptive electric vehicle supply equipment (EVSE) system of claim 1, including a relay unit connected between the electric service panel and the EVSE current transformer, the relay unit enabled to switch power to the output.

4. The load adaptive electric vehicle supply equipment (EVSE) system of claim 1, wherein the output is connected to a J1772 electric vehicle plug.

5. In an electric vehicle supply equipment (EVSE) system, a load adaptive EVSE unit, comprising:
an auxiliary controller in bi-directional data communication with a controller module, wherein an EVSE current transformer is connected between the controller module and an output and wherein the controller module transmits a pilot output signal to the output;
wherein a panel current transformer is connected between a panel and the controller module;
wherein the auxiliary controller is configured to measure current load at the panel current transformer and transmit the current load measurements at the panel to the controller module; and
wherein the controller module is configured to compare the current load measurements at the panel current transformer with current load measurements at the EVSE current transformers against a predetermined maximum allowable current of the panel and adjust the pilot output signal to adjust the current at the output, and
wherein the controller module is configured to reduce the pilot output signal to the output if the current load at the panel current transformer is equal to or greater than 95% of the predetermined maximum allowable current of the electric service panel.

6. The EVSE unit of claim 5, wherein the controller module includes a display and a communications interface.

7. The EVSE unit of claim 5, including a relay unit connected between the panel and the EVSE current transformer, the relay unit enabled to switch power to the output.

8. The EVSE unit of claim 5, wherein the output is connected to a J1772 electric vehicle plug.

9. The EVSE unit of claim 5, wherein the auxiliary controller communicates with the controller module via an application program interface.

10. A method of controlling adjusting current load of an electric vehicle supply equipment (EVSE) system:
measuring the current load at a panel current transformer, the panel current transformer connected between a controller module and an electric service panel;
measuring the current load at an EVSE current transformer, the EVSE current transformer connected between the controller module and an output;
comparing the current load at the panel current transformer with the current load at the EVSE current transformer against a predetermined maximum allowable current of the electric service panel; and
adjusting a pilot output signal transmitted by the controller module to the output to adjust the current at the output,
wherein if the current load at the panel current transformer is equal to or greater than 95% of the predetermined maximum allowable current of the electric service panel, then reducing the pilot output signal to the current at the output.

11. A load adaptive electric vehicle supply equipment (EVSE) system, comprising:
an EVSE unit comprising a controller module, an EVSE current transformer, and an output, wherein the EVSE current transformer is connected between the controller module and the output and wherein the controller module transmits an pilot output signal to the output;
an electric service panel including a panel current transformer, wherein the panel current transformer is connected between the electric service panel and the controller module; and
wherein the controller module is configured to compare current load measurements at the panel current transformer with current load measurements at the EVSE current transformers against a predetermined maximum allowable current of the electric service panel and adjust the pilot output signal to adjust the current at the output, and
wherein the controller module is configured to increase the pilot output signal to a predetermined maximum allowable current at the output if the current at the panel current transformer is less than 95% of the predetermined maximum allowable current of the electric service panel and the current load at the EVSE current transformer is below the predetermined maximum allowable current at the output.

12. The load adaptive electric vehicle supply equipment (EVSE) system of claim 11, wherein the controller module includes a display and a communications interface.

13. The load adaptive electric vehicle supply equipment (EVSE) system of claim 11, including a relay unit connected between the electric service panel and the EVSE current transformer, the relay unit enabled to switch power to the output.

14. The load adaptive electric vehicle supply equipment (EVSE) system of claim 11, wherein the output is connected to a J1772 electric vehicle plug.

15. In an electric vehicle supply equipment (EVSE) system, a load adaptive EVSE unit, comprising:
an auxiliary controller in bi-directional data communication with a controller module, wherein an EVSE current transformer is connected between the controller module and an output and wherein the controller module transmits a pilot output signal to the output;
wherein a panel current transformer is connected between a panel and the controller module;
wherein the auxiliary controller is configured to measure current load at the panel current transformer and transmit the current load measurements at the panel to the controller module; and
wherein the controller module is configured to compare the current load measurements at the panel current transformer with current load measurements at the EVSE current transformers against a predetermined maximum allowable current of the panel and adjust the pilot output signal to adjust the current at the output, and
wherein the controller module is configured to increase the pilot output signal to a predetermined maximum allowable current at the output if the current at the panel current transformer is less than 95% of the predetermined maximum allowable current of the electric service panel and the current load at the EVSE current transformer is below the predetermined maximum allowable current at the output.

16. The EVSE unit of claim 15, wherein the controller module includes a display and a communications interface.

17. The EVSE unit of claim 15, including a relay unit connected between the panel and the EVSE current transformer, the relay unit enabled to switch power to the output.

18. The EVSE unit of claim 15, wherein the output is connected to a J1772 electric vehicle plug.

19. A method of controlling adjusting current load of an electric vehicle supply equipment (EVSE) system:
   measuring the current load at a panel current transformer, the panel current transformer connected between a controller module and an electric service panel;
   measuring the current load at an EVSE current transformer, the EVSE current transformer connected between the controller module and an output;
   comparing the current load at the panel current transformer with the current load at the EVSE current transformer against a predetermined maximum allowable current of the electric service panel; and
   adjusting a pilot output signal transmitted by the controller module to the output to adjust the current at the output,
   wherein if the current at the panel current transformer is less than 95% of the predetermined maximum allowable current of the electric service panel and the current load at the EVSE current transformer is below a predetermined maximum allowable current at the output, then increasing the pilot output signal to the predetermined maximum allowable current at the output.

* * * * *